Figure 1:
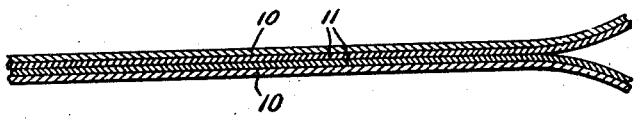

Aug. 19, 1947.  F. W. HYMAN  2,425,805
METHOD OF MAKING LAMINATED STRUCTURES
Filed April 28, 1943

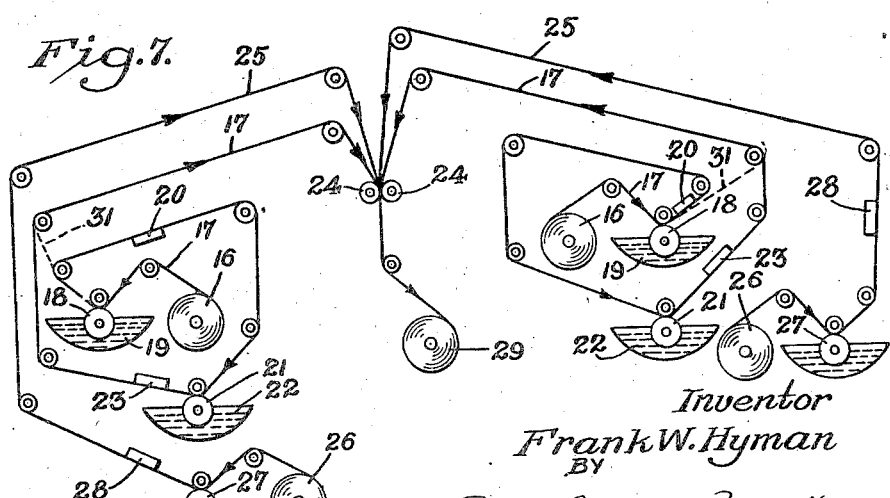
Inventor
Frank W. Hyman
BY
Parker, Carlson, Pitzner & Hubbard
Attorneys.

Patented Aug. 19, 1947

2,425,805

UNITED STATES PATENT OFFICE 2,425,805

METHOD OF MAKING LAMINATED STRUCTURES

Frank W. Hyman, New York, N. Y.

Application April 28, 1943, Serial No. 484,866

1 Claim. (Cl. 154—50)

The invention relates to a method of making a laminated structure and particularly to such structures in which one or more of the laminations is composed of a more or less porous or fibrous material, such as paper, straw or chip board, wood veneers and the like, which is pervious to or penetrable by vapors, moisture or water and other fluids.

An object of the invention is to provide a new and improved method of making a laminated structure utilizing non-critical materials which structure will be impervious to and proof against penetration by moisture, water or other fluids and in particular is vapor proof.

Another object more particularly stated is to provide a novel method of making a laminated structure in which the outside sheets of porous or fibrous material in an arrangement of laminations have their inner surfaces coated with a substance which makes these outside sheets impenetrable and prevents "strike-through" or "show through" of substances or coatings forming an internal part of the structure.

Laminated structures of the various types heretofore known to me and with particular reference to structures in which the outer sheets are of paper, straw or chip board or the like have had inherent disadvantages which limited their use. They have not been wholly impenetrable especially to vapors, which precluded their use as wrapping means for food products and particularly those which readily absorbed contaminating odors. Their penetrability by moisture, water and fluids make it impossible to use them in connection with many materials heavy in moisture or oil or with others which would be adversely affected by moisture. Furthermore, "strike-through" (as the penetration through a sheet of a material coated on or in contact with one surface thereof is sometimes known) destroys the appearance of the sheet and usually prevents its use as a printed surface. An example of "strike-through" is found in insulating material where a plurality of sheets of kraft paper are laminated together by means of intermediate layers or coating of asphalt.

Another object therefore is to provide a method of making a laminated structure in which at least one outer lamination is a sheet of a fibrous material such as paper, straw or chip board, thin wood veneers or like more or less porous material, and in which such lamination on its inner surface has a coating of a hot melt synthetic resinous material that forms upon cooling a flexible vapor, moisture and water proof layer capable of preventing the passage of other materials through the outer lamination.

Other objects and advantages will become apparent in the following description and from the accompanying drawing in which:

Figure 1 is a somewhat diagrammatic view showing in cross section and on an exaggerated scale one form of laminated structure.

Figs. 2 to 6, inclusive, are similar views showing modifications of the structure illustrated in Fig. 1.

Fig. 7 shows diagrammatically a machine arranged to produce laminated structures according to the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For convenience I shall refer to paper as being representative of the various fibrous material such as straw and chip board, kraft and other papers, wood veneers and the like which may form one or more of the laminations of the structure.

I have found that such materials can in a laminated structure be rendered impervious to and impenetrable by vapors, moisture and water by coating or otherwise applying to a surface of a sheet of the material a layer or film of a thermoplastic or hot-melt synthetic resin material combined with a wax and a plasticiser if required to impart thereto the characteristics of being quite fluid and easy to apply when heated to a desired temperature and of forming when cool a flexible, somewhat resilient and completely vapor, moisture and water proof layer on the paper. The coated surface of the sheet is then brought against either a similarly coated surface of another sheet or, where the coating is sufficiently heavy, against the uncoated surface of the other sheet and the two sheets are pressed together with the hot-melt material acting as a binder or adhesive to unite the sheets. The resulting structure is illustrated in Fig. 1 where the numeral 10 designates the paper sheets which are separated by the hot-melt material 11. The hot-melt material does not materially diminish the flexibility of the paper so that it may be folded, creased and otherwise fashioned into boxes and the like by suitable folding machines or used in comparable machines as a wrapping material.

It has been found that such laminated structures may be sharply bent or even doubled without breaking or cracking the heavier materials due possibly to the fact that the penetration of the hot-melt material strengthens the paper and the flexible resilient character of the layer permits it to yield to bending strains.

The following formula of suitable thermoplastic or hot-melt materials are given by way of example, the proportions being by weight.

1

| | Parts |
|---|---|
| Cumar resin | 60 |
| Blown soya bean oil | 20 |
| Carnauba wax | 20 |

2

| | |
|---|---|
| Hydrogenated rosin (Staybelite) | 70 |
| Carnauba wax | 30 |

3

| | |
|---|---|
| Rosin (wood rosin) | 70 |
| Carnauba wax | 30 |

4

| | |
|---|---|
| Hydrogenated rosin (Staybelite) | 80 |
| Paraffin wax | 20 |

5

| | |
|---|---|
| Cumar resin | 70 |
| Heavy bodied China-wood oil | 20 |
| Carnauba wax | 10 |

6

| | |
|---|---|
| Cumar resin | 40 |
| Gilsonite resin | 40 |
| Paraffin oil | 20 |

7

| | Per cent |
|---|---|
| Gilsonite | 50 |
| Candelilla wax | 50 |

8

| | |
|---|---|
| Synthetic petroleum resin (Santo resin) | 75 |
| Ozokerite | 25 |

These materials melt at less than 200° F. and are usually applied at a slightly higher temperature (220° F. to 280° F.) to insure an even uniform flow. A laminated paper with such material forming an intermediate layer between the outside sheets will be flexible, vapor and moisture proof and will be eminently suitable for such uses as in wrappers for cigarettes, in packaging rations, wrapping foods, and as wrappers for materials of all kinds for export.

Figure 2:
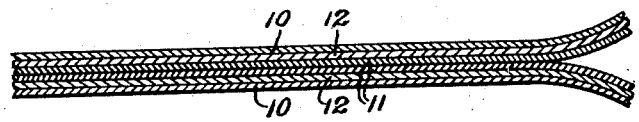

Under certain conditions, as where the paper is relatively porous so that there is a tendency for the hot-melt material to strike through the paper, I preferably apply a preliminary coating of a suitable filler to the paper before applying the hot-melt fluid. A laminated structure of this character is illustrated in Fig. 2 wherein filler layers or coatings 12 are shown between the paper 10 and the inner hot-melt material 11. As a filler many substances are suitable, such as animal, fish and starch glues and, when available, synthetic rubber compounds, vinyl and cellulose lacquers. A preferred filler is one composed of a fluid synthetic melamine resin and a plasticiser since such product has water repelling qualities and also increases the strength of the paper by bonding the fibres together.

Figure 3:
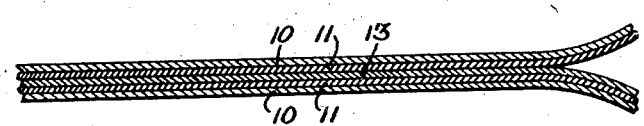

An important advantage resulting from the provision of the hot-melt fluid next to the paper (either filled or unfilled) is that other materials may readily be included as central or intermediate laminations without in any way affecting the appearance of the outer paper surfaces. Thus, as shown in Fig. 3, the two layers of hot-melt material 11 on the paper sheets 10 are separated by a coating or layer 13 of asphalt or comparable bitumen. Heretofore the use of such substances in a laminated paper structure precluded the use thereof for many purposes because of the peculiarly penetrating odor of the asphalt. Moreover, such structures had a characteritsic appearance resulting from the asphaltic material striking through the paper. Such outer surfaces could not be satisfactorily printed or coated. In my present structure the hot-melt material confines the asphaltic material against striking through the paper, prevents the escape of its odor and also keeps the asphaltic material from drying out and becoming hard and brittle. The outer surfaces are accordingly unblemished by "strike through" and permit printing thereon. The structure is highly satisfactory for use as a heat and cold insulating medium, and for decorative panelling as well as a wrapping and packaging material for widespread use.

Figure 4:
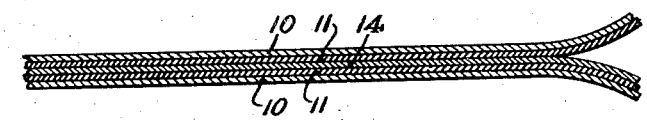

In other instances it may be desirable to apply materials other than asphalt as the layer 13. Thus I may apply a metal layer composed of metal particles from a fluid carrying medium, thereby obtaining flexible layers of such metals as silver, aluminum, and copper. When the layer 13 is an asphaltic material it is preferably applied hot but at a lower temperature than the melting point of the hot-melt fluid. The same precaution would be observed in the application of any other heated material to form the layer 13.

Where desired a sheet of a strengthening or reenforcing material may be introduced between the hot-melt layers. One such material which may be advantageously used in such manner is regenerated cellulose in thin film or sheet form. Fig. 4 shows this arrangement, the cellulose sheet being designated by the numeral 14. The hot-melt fluid fills and completely seals minute pin holes in the cellulose sheet and the sheet is adequately protected against tearing or breaking while materially increasing the strength and impermeability of the laminated structure. Instead of a cellulose sheet other reenforcing materials such as glassine paper, and woven or mesh fabrics of cotton, paper, spun glass or the like may be used.

Figure 5:
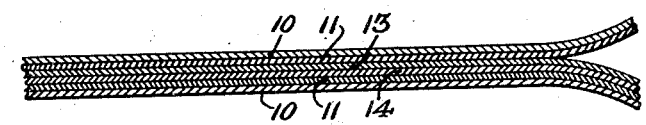
Figure 6:
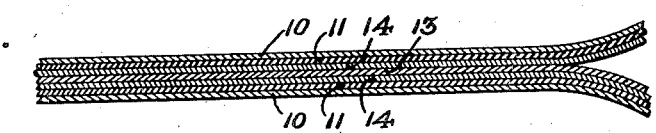

In Figs. 5 and 6 laminated structures are illustrated that combine the advantages of those shown in Figs. 3 and 4. Thus in Fig. 5 the central laminations comprise, for example, a layer 13 of asphalt and a sheet 14 of regenerated cellulose while in Fig. 6 the layer of asphalt is disposed between two sheets of regenerated cellulose. The central laminations, as before, are between paper laminations having their inner surfaces sealed by the hot-melt material.

The method of making a laminated structure may be carried out by numerous devices, as well as by hand. A suitable arrangement of machine elements is shown diagrammatically in Fig. 7. Presuming that a laminated structure substantially corresponding to that shown in Fig. 6 but with a filler is to be produced, the numeral 16 designates supply rolls of paper stock for the outside laminations. The webs 17 from these rolls pass coating rolls 18 which apply in this instance coatings or layers of a selected filler supplied from reservoirs 19. The webs may next pass heaters or dryers 20 if desired and then pass second coating rolls 21 for applying hot-melt fluid from reservoirs 22. From these rolls the webs may pass suitable cooling means 23 and lead to gathering or pressure rolls 24. Webs 25 from supply rolls of a regenerated cellulose material 26 may at the same time lead to rolls 27 for applying asphalt, then past cooling devices 28 to the gathering or pressure rolls 24, the webs 25 being led into the rolls 24 between the paper webs. In such an arrangement the cellulose webs will be adhesively joined together by the intervening asphalt coatings and the paper webs will be joined to the cellulose webs by the hot-melt material. The finished laminated structure is received on a rewind roll 29.

The organization shown in Fig. 7 may be altered as desired to produce any other desired arrangement of laminations. Thus omission of one or the other of the cellulose webs 25 will produce the structure of Fig. 4 plus the filler coatings while the latter can be omitted by using only the hot-melt coating rolls. To produce the structure shown in Fig. 1 the filler reservoirs 19 can either be by-passed or used as the hot-melt reservoirs. In the latter case the reservoirs 22 would be omitted and the webs 17 would by-pass the rolls 21 as indicated by the dotted lines 31. Use of the reservoirs 19 for hot-melt fluid and the reservoirs 22 for asphalt would produce the structure shown in Fig. 3 while the omission of the cellulose webs will result in the structure of Fig. 2. Other combinations of laminations are of course readily obtainable with comparable arrangements.

I claim as my invention:

The method of making a flexible laminated structure comprising coating the inside surfaces of two opposed sheets of fibrous material with a filler, drying the filler, applying to said surfaces a hot-melt material which cools to form a flexible water-proof layer on said filler, cooling the hot-melt material, applying asphaltic material to the inner surfaces of two opposed sheets of regenerated cellulose material, cooling the asphaltic material, then leading the sheets of the cellulose material between said first mentioned sheets and joining all of said sheets together under pressure.

FRANK W. HYMAN.

REFERENCES CITED

The following references are of record in the file of this patent:

UNITED STATES PATENTS

| Number | Name | Date |
| --- | --- | --- |
| 2,078,422 | Smith | Apr. 27, 1937 |
| 2,315,128 | Newkirk | Mar. 30, 1943 |
| 2,015,796 | Hans et al. | Oct. 1, 1935 |
| 2,087,209 | Lahey et al. | July 13, 1937 |
| 694,522 | Bird | Mar. 4, 1902 |
| 1,962,660 | Keller | June 12, 1934 |
| 1,984,814 | Sherman | Dec. 18, 1936 |
| 1,922,867 | Rosemant | Aug. 15, 1933 |
| 1,353,323 | Davidson | Sept. 21, 1920 |
| 2,031,035 | Dreymann | Feb. 18, 1936 |
| 2,031,036 | Dreymann | Feb. 18, 1936 |

FOREIGN PATENTS

| Number | Country | Date |
| --- | --- | --- |
| 510,112 | Great Britain | July 27, 1939 |